US012713226B2

(12) United States Patent
Lee et al.

(10) Patent No.: US 12,713,226 B2
(45) Date of Patent: Aug. 18, 2026

(54) METHOD AND APPARATUS FOR CONTROLLING EXECUTION MODE OF FUNCTION BEING EXECUTED BY USER EQUIPMENT IN WIRELESS COMMUNICATION SYSTEM

(71) Applicant: Samsung Electronics Co., Ltd., Gyeonggi-do (KR)

(72) Inventors: Sangho Lee, Gyeonggi-do (KR); Sooeun Song, Gyeonggi-do (KR); Deokhui Lee, Gyeonggi-do (KR); Jaehong Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 466 days.

(21) Appl. No.: 18/110,142

(22) Filed: Feb. 15, 2023

(65) Prior Publication Data

US 2024/0137750 A1 Apr. 25, 2024
US 2024/0236648 A9 Jul. 11, 2024

(30) Foreign Application Priority Data

Oct. 24, 2022 (KR) ........................ 10-2022-0137651

(51) Int. Cl.
*H04W 8/22* (2009.01)
*H04W 88/02* (2009.01)

(52) U.S. Cl.
CPC .............. *H04W 8/22* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 8,855,618 | B2 | 10/2014 | Hwang et al. | |
| 9,268,387 | B2 | 2/2016 | Yu | |
| 9,549,374 | B2 * | 1/2017 | Lim | H04W 52/0258 |
| 11,153,777 | B2 | 10/2021 | Heo et al. | |
| 11,510,153 | B2 | 11/2022 | Lee et al. | |
| 2012/0178496 | A1 * | 7/2012 | Hwang | H04W 52/0264 455/550.1 |

(Continued)

FOREIGN PATENT DOCUMENTS

| | | | | |
|---|---|---|---|---|
| DE | 102019117780 A1 * | 4/2020 | H04W 8/24 |
| EP | 2592877 A2 * | 5/2013 | H04N 23/667 |

(Continued)

OTHER PUBLICATIONS

International Search Report dated Jul. 24, 2023 issued in counterpart application No. PCT/KR2022/016263, 9 pages.

(Continued)

*Primary Examiner* — Jinsong Hu
*Assistant Examiner* — Alexander J Yi
(74) *Attorney, Agent, or Firm* — The Farrell Law Firm, P.C.

(57) ABSTRACT

A method by which a user equipment (UE) operates in a wireless communication system includes obtaining status information of the UE, identifying an execution mode of each function of a plurality of functions being executed by the UE, identifying at least one function whose execution mode is to be changed among the functions being executed by the UE, based on the status information of the UE, and changing the execution mode of the identified at least one function.

15 Claims, 6 Drawing Sheets

(56) References Cited

U.S. PATENT DOCUMENTS

| | | | | |
|---|---|---|---|---|
| 2014/0210754 | A1* | 7/2014 | Ryu | G06F 1/1626 345/173 |
| 2020/0218319 | A1 | 7/2020 | Shah et al. | |
| 2020/0367176 | A1* | 11/2020 | Lee | G06F 1/3287 |
| 2020/0404545 | A1 | 12/2020 | Yang | |
| 2021/0345238 | A1 | 11/2021 | Behnamfar et al. | |
| 2021/0400588 | A1 | 12/2021 | Hong | |

FOREIGN PATENT DOCUMENTS

| | | | |
|---|---|---|---|
| JP | 2010-258680 | 11/2010 | |
| KR | 1020120080868 | 7/2012 | |
| KR | 1020130139551 | 12/2013 | |
| KR | 10-2020-0004146 | 1/2020 | |
| KR | 10-2020-0071088 | 6/2020 | |
| KR | 10-2020-0132161 | 11/2020 | |
| KR | 1020210034187 | 3/2021 | |
| WO | WO 2014/026609 | 2/2014 | |
| WO | WO-2015126095 A1 * | 8/2015 | A61B 5/0022 |
| WO | WO 2021/17600 | 9/2021 | |
| WO | WO 2021/172600 | 9/2021 | |
| WO | WO 2022/165826 | 8/2022 | |

OTHER PUBLICATIONS

International Preliminary Report dated Dec. 6, 2024 issued in counterpart application No. PCT/KR2022/016263, 12 pages.

European Search Report dated Oct. 23, 2025 issued in counterpart application No. 22962932.4-1206, 9 pages.

* cited by examiner

METHOD AND APPARATUS FOR CONTROLLING EXECUTION MODE OF FUNCTION BEING EXECUTED BY USER EQUIPMENT IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0137651, which was filed in the Korean Intellectual Property Office on Oct. 24, 2022, the entire disclosure of which is incorporated herein by reference.

BACKGROUND

1. Field

The disclosure generally relates to a wireless communication system and, more particularly, to a method and apparatus for changing an execution mode of at least one function being executed in a user equipment (UE), based on status information of the UE.

2. Description of the Related Art

Various generations of radio communications have been developed, from fourth-generation (4G) to sixth-generation (6G), technologies for human-targeted services such as voice, multimedia, data or the like have usually been developed. Connected devices that are on the explosive rise after commercialization of fifth-generation (5G) communication systems are expected to be connected to communication networks. As examples of things connected to networks, there may be cars, robots, drones, home appliances, displays, smart sensors installed in various infrastructures, construction machinery, factory equipment, etc. Mobile devices are expected to evolve to various form factors such as augmentation reality (AR) glasses, virtual reality (VR) headsets, hologram devices, and the like. In order to provide various services by connecting hundreds of billions of devices and things in the sixth-generation (6G) era, there are ongoing efforts to develop better 6G communication systems. For these reasons, 6G communication systems are referred to as beyond-5G systems.

In the 6G communication system that is expected to become a reality by around 2030, a maximum transfer rate is tera bits per second (bps), i.e., 1000 giga bps, and a maximum wireless delay is 100 micro seconds (usec). In other words, compared to the 5G communication system, the 6G communication system provides a transfer rate that 50 times faster and reduces wireless delay by a tenth.

To attain these high data transfer rates and ultra-low delay, the 6G communication system is considered to be implemented in the terahertz (THz) band (e.g., ranging from 95 gigahertz (GHz) to 3 THz). Due to the more severe path loss and atmospheric absorption phenomenon in the THz band as compared to the millimeter wave (mmWave) band of 5G systems, importance of technology for securing a signal range, i.e., coverage, is expected to grow. As major technologies for securing coverage, radio frequency (RF) elements, antennas, new waveforms superior to orthogonal frequency division multiplexing (OFDM) in terms of coverage, beamforming and massive multiple-input and multiple-output (massive MIMO), full dimensional MIMO (FD-MIMO), array antennas, multiple antenna transmission technologies such as large-scale antennas, etc., need to be developed. Besides, new technologies for increasing coverage of THz band signals, such as metamaterial based lenses and antennas, a high-dimensional spatial multiplexing technique using orbital angular momentum (OAM), reconfigurable intelligent surface (RIS), etc., are being discussed.

To enhance frequency efficiency and system networks, a full duplex technology by which both uplink (UL) and downlink (DL) transmissions use the same frequency resource at the same time, a network technology that comprehensively uses satellite and high-altitude platform stations (HAPS) and the like, a network structure innovation technology supporting mobile base stations and allowing optimization and automation of network operation, a dynamic spectrum sharing technology through collision avoidance based on spectrum usage prediction, an artificial intelligence (AI) based communication technology to realize system optimization by using AI from the designing stage and internalizing an end-to-end AI supporting function, a next generation distributed computing technology to realize services having complexity beyond the limit of terminal computing capability by using ultrahigh performance communication and computing resources (e.g., mobile edge computing (MEC) cloud) are being developed in the 6G communication system. In addition, by designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience will become possible through hyper-connectivity of the 6G communication system including not only connections between things but also connections between humans and things. Specifically, it is predicted that services such as truly immersive extended reality (truly immersive XR), high-fidelity mobile hologram, digital replica, etc., may be provided. Further, services such as remote surgery, industrial automation and emergency response with enhanced security and reliability may be provided through the 6G communication system to be applied in various areas such as industry, medical care, vehicles, appliances, etc.

SUMMARY

The disclosure has been made to address at least the above-mentioned problems and/or disadvantages and to provide at least the advantages described below.

Embodiments provide an efficient communication service by controlling respective modes of functions being executed according to a condition of a UE in a wireless communication system to which various technologies are applied.

Embodiments may limit certain modem functions by controlling the respective modes of the functions in phases and flexibly control the UE's power consumption per unit of time, data throughput per unit of time, data transfer rate or an amount of generated heat, as required.

An aspect of the disclosure provides a method by which a UE operates in a wireless communication system, with the method including obtaining status information of the UE; identifying an execution mode of each function of a plurality of functions being executed by the UE; identifying at least one function whose execution mode is to be changed among the functions being executed by the UE, based on the status information of the UE; and changing the execution mode of the identified at least one function.

Another aspect of the disclosure provides a UE for controlling an execution mode of a function in a wireless communication system, the UE includes a transceiver and at least one processor, which is configured to obtain status information of the UE; identify an execution mode of each function of a plurality of functions being executed by the UE; identify at least one function whose execution mode is to be changed among the functions being executed by the UE, based on the status information of the UE; and change the execution mode of the identified at least one function.

A further aspect of the disclosure provides a non-transitory computer-readable recording medium having recorded thereon a program for causing a computer to perform the method including obtaining status information of a UE; identifying an execution mode of each function of a plurality of functions being executed by the UE; identifying at least one function whose execution mode is to be changed among the functions being executed by the UE, based on the status information of the UE; and changing the execution mode of the identified at least one function.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
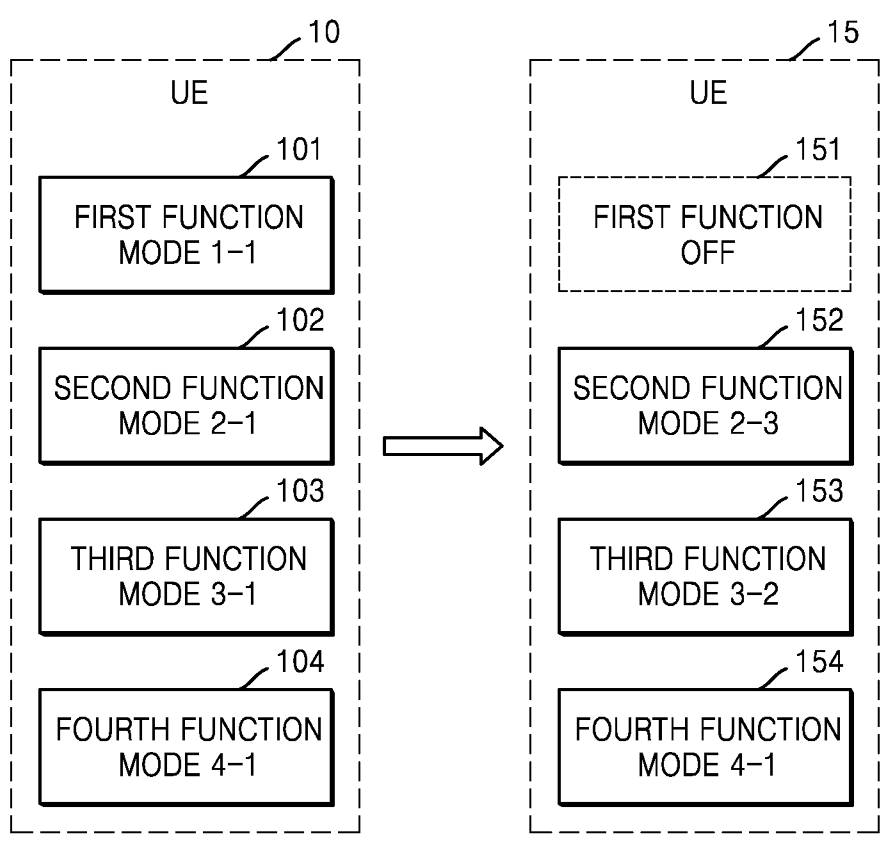
FIG. 1 is a diagram illustrating functions being executed by a UE and execution modes of the functions in a wireless communication system, according to an embodiment.

Embodiments are described in detail herein with reference to accompanying drawings.

Description of technological content well-known in the art or not directly related to the disclosure will be omitted herein. Through the omission of the content that might otherwise obscure the subject matter of the disclosure, the subject matter will be understood more clearly. Further, the terms, as will be mentioned later, are defined by taking functionalities in the disclosure into account, but may vary depending on practices or intentions of users or operators. Accordingly, the terms should be defined based on description herein.

Certain parts in the accompanying drawings are exaggerated, omitted or schematically illustrated. The size of the respective elements may not fully reflect their actual size. Like numbers refer to like elements throughout the drawings.

Throughout the disclosure, the expression at least one of a, b or c indicates only a, only b, only c, both a and b, both a and c, both b and c, all of a, b, and c, or variations thereof.

Throughout the disclosure, a layer may also be referred to as an entity.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements herein. In the description of the disclosure, when it is determined that a detailed description of related functions or configurations may unnecessarily obscure the subject matter of the disclosure, the detailed description will be omitted.

A BS as herein used may refer to an entity for performing resource allocation for a UE and may be at least one of gNode B, eNode B, Node B (or xNode B, where x represents any letter including g and e), a radio access unit, a BS controller, a satellite, an airborne vehicle or a node in a network. A UE may include a mobile station (MS), a vehicle, a satellite, an airborne vehicle, a cellular phone, a smart phone, a computer, or a multimedia system having a communication function. Herein, DL may refer to a radio transmission path for a signal transmitted from a BS to a UE, and UL may refer to a radio transmission path for a signal transmitted from a UE to a BS. In addition, there may be a sidelink (SL) that refers to a radio transmission path for a signal transmitted from a UE to another UE.

Although the following embodiments focus on the long term evolution (LTE), LTE-Advanced (LTE-A) or a 5G system as an example, they may be applied to other communication systems with similar technical backgrounds or channel types. For example, the other communication systems may include a 5G-Advanced, new radio (NR)-Advanced or 6G mobile communication technology developed after the 5G mobile communication technology (or NR), and the term 5G may be a concept including the existing LTE, LTE-A and other similar services. Embodiments may be applied to different communication systems with some modifications to such an extent that does not significantly deviate the scope of the disclosure, as would be recognized by one of skill in the art.

It will be understood that each block and combination of the blocks of a flowchart may be performed by computer program instructions. The computer program instructions may be loaded onto a processor of a universal computer, a special computer or other programmable data processing equipment. The computer program instructions may be stored in a memory that may be oriented toward a computer or other data processing equipment to implement a function, and the instructions stored in the computer-readable memory may perform a function as illustrated in a block(s) of a flowchart. The computer program instructions may also be loaded onto computers or programmable data processing equipment, and may provide steps for performing the functions described in the block(s) of the flowchart in the computer or other programmable data processing equipment.

Each block may represent a part of a module, segment, or code including one or more executable instructions to perform particular logic function(s). Functions of the blocks may be performed out of the sequence. For example, two successive blocks may be performed substantially at the same time or in reverse order depending on the corresponding functions.

The term module (or sometimes unit) as used herein refers to a software or hardware component, such as a field programmable gate array (FPGA) or an application specific integrated circuit (ASIC), which may perform some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

In the following description, the terms referring to broadcast information, control information, state changes (e.g., events), network entities, messages, and components of an apparatus, the terms related to communication coverage, etc., are mentioned for convenience of explanation. The disclosure is not limited to the terms as will be used in the following description, and may use different terms having the same meaning in a technological sense.

For convenience of explanation, terms and definitions used in the most recent standards among the currently existing communication standards, i.e., in the LTE and NR standards defined in the 3rd Generation Partnership Project (3GPP) will be used herein. The disclosure is not, however, limited to the terms and definitions, and may be equally applied to any systems that conform to other standards.

FIG. 1 is a diagram illustrating functions being executed by a UE and execution modes of the functions in a wireless communication system, according to an embodiment.

In an embodiment, a UE may perform various functions (or features) on a communication platform.

The beyond-LTE communication systems require support for a service that may freely reflect various requirements of the user and the service provider. Services considered for the beyond-5G communication system may include enhanced mobile broad band (eMBB), massive machine type communication (mMTC), ultra-reliability low latency communication (URLLC), etc.

The beyond-5G communication system may transmit a large amount of data while performing various functions and consume more power, and may thereby lead to an increase in temperature of the UE. For example, the UE naturally consumes more power due to the use of high frequency bands and the increase in data throughput, and accordingly generate more heat, causing an overheating phenomenon. When the UE is overheated, an antenna module or components arranged around the overheated region may be damaged, or performance may deteriorate, and the user may be inconvenienced. Hence, there is a need for a method of efficiently controlling heat generation of the UE for smooth communication of the UE to provide a communication service.

In an embodiment, a method of controlling a UE-oriented function is provided. The method includes obtaining status information of a UE, identifying an execution mode of each function being executed by the UE, identifying at least one function whose execution mode is to be changed among the functions being executed by the UE based on the status information of the UE, and changing the execution mode of the identified at least one function.

Referring to FIG. 1, a UE 10 executes at least one function (a first function 101, a second function 102, a third function 103, and a fourth function 104). The functions (the first to fourth functions 101 to 104) being executed by the UE 10 may represent various technologies that make up a communication platform or that are supported by a communication platform. In an embodiment, the UE 10 executes the first to fourth functions 101 to 104 that indicate an occasion when technologies corresponding to the first to fourth functions 101 to 104 are applied to the UE 10 or activated by the UE 10, or when operations corresponding to the first to fourth functions 101 to 104 are performed by the UE 10.

When the UE 10 executes a certain function (e.g., the first function 101, the second function 102, the third function 103, or the fourth function 104), the UE 10 may execute the function in a certain mode. For example, the UE 10 may execute an n-th function in a mode n-m, where n and m are natural numbers, with m being a number that is greater than or equal to 1 and is less than or equal to M, with M indicating the number of different execution modes of the n-th function. Referring to FIG. 1, where the UE 10 executes the first to fourth functions 101 to 104, the UE 10 may execute the first function 101 in mode 1-1, the second function 102 in mode 2-1, the third function 103 in mode 3-1 and the fourth function 104 in mode 4-1.

For example, the functions that may be executed by the UE 10 may each correspond to an extreme multiple-input multiple-output (X-MIMO) function, a high frequency enabled function, a cross division duplex (XDD) function, a multi transmission and reception port (multi-TRP) function, an AI model enabled function, or any of other various functions.

An X-MIMO function (i.e., an e-MIMO function) may be related to a technology that supports many digital ports. For example, a UE that performs the X-MIMO function may support many digital ports. With the increase in the number of digital ports supported in the wireless communication system, the number of communication channels increases as well. As the number of communication channels increases, a huge amount of channel state information (CSI) is to be measured by the UE. In this case, the UE needs to perform a huge amount of CSI feedback, causing an increase in power consumption.

The high frequency enabled function may be related to a technology of using beams in high frequency bands for wireless communication. Frequencies in the high frequency band are characterized by having a higher level or directness thus travel fast, but have narrow coverage because of a short service range and difficulty in avoidance of obstacles. Hence, the high frequency band has a heavy path loss, requiring the UE to transmit beams of high intensity to secure sufficient UL coverage. In the case of using beams in the high frequency band, the UE needs to increase the intensity of emission beams, which may increase power consumption of the UE.

The XDD function, an adaptive duplex (AD) function or a flexible duplex function may be related to a technology for transmitting UL data for a long time by extending UL slots to make the UL transmission more effective. When the XDD function is activated, a DL and a UL may overlap each other in some areas in the time domain. Hence, a reference signal (RS) for measuring a cross link interference (CLI) needs to be transmitted. In this case, power consumption of the UE may increase because the UE needs to perform more CLI feedback operations and also transmit a UL signal for much longer time than when the XDD function is deactivated.

An execution mode for the XDD function may be determined in phases according to sections to which UL slots are additionally allocated, for example as summarized in Table 1.

TABLE 1

| Mode | Description |
|---|---|
| Mode 1 | UL slot capability 100% |
| Mode 2 | UL slot capability 50% |
| Mode 3 | UL slot capability 0% |

Referring to Table 1, three execution modes for the XDD function may be determined according to sections to which UL slots are additionally allocated. The smaller the UL slot section, the narrower the section overlapping with a DL in the time domain. Thus, the UL signal is transmitted for a short time, which is a low power mode. Accordingly, in the embodiment of Table 1, mode 2 is the low power mode as compared to mode 1, and mode 3 is the low power mode as compared to the mode 2. The mode 3 corresponding to 0% of the additional UL slot allocation section may also correspond to an off state of the XDD function.

Although an embodiment in which there are three-step execution modes of the XDD function is illustrated in Table 1, the XDD function may have a greater or lesser number of execution modes.

When determining whether to change the execution mode of the XDD function, the UE may transmit corresponding information to the BS and request a resource allocation change. On receiving the resource allocation change request message from the UE due to the change of the execution mode of the XDD function, the BS may transmit a resource allocation change response message to the UE. Alternatively, the UE may transmit, to the BS, information indicating that support for the XDD function is not available according to status information of the UE.

The multi-TRP function may be related to a coordinated communication technology between BSs to make UL transmission more effective by simultaneously transmitting data to the plurality of BSs or controlling antenna beams. In an embodiment, the UE may communicate with the plurality of BSs with the same port and same resource (coherent joint transmission (JT)) or with a different port and a different resource for each BS (non-coherent JT). When communicating with the plurality of BSs, the UE may have high data throughput with an increase in the number of channels, and may have increased UL coverage and improved UE mobility. On the other hand, the UE needs to perform a huge amount of CSI feedback due to the increase in the number of channels, causing an increase in power consumption of the UE.

An execution mode of the multi-TRP function may be determined in phases according to the number of BSs connected to the UE, for example as summarized in Table 2.

TABLE 2

| Mode | Description |
|---|---|
| Mode 1 | Connected TRP # = 4 |
| Mode 2 | Connected TRP # = 2 |
| Mode 3 | Connected TRP # = 1 |

Referring to Table 2, three execution modes for the multi-TRP function may be determined according to the number of BSs connected to the UE. The smaller the number of BSs connected to the UE, the smaller the number of channels, which is a low power mode. Accordingly, in the embodiment of Table 2, mode 2 is the low power mode as compared to mode 1, and mode 3 is the low power mode as compared to the mode 2. The mode 3 in which the UE is connected to one BS may correspond to an off state of the multi-TRP function.

Although an embodiment of the multi-TRP function with three-step execution modes is illustrated in Table 2, the execution mode of the multi-TRP function may have a greater or lesser number of execution modes.

When determining whether to change the execution mode of the multi-TRP function, the UE may transmit corresponding information to the BS. Alternatively, the UE may provide feedback to the BS by measuring CSI for only N channels smaller than the total number of channels instead of explicitly notifying the BS of the change of the execution mode of the multi-TRP function. In this case, the UE may limit a precoding matrix indicator (PMI) of the CSI feedback to CSI codebook layer N, and may also report a rank indicator (RI) as N to the BS. Alternatively, the UE may transmit, to the BS, information indicating that support for the multi-TRP function is not available according to the status information of the UE.

The AI model enabled function may be related to a technology that uses an AI model for operations of the UE or the BS.

For example, the AI model enabled function may be related to a technology that uses an AI-based nonlinear compensator for an operation of relieving backoff of a power amplifier of the UE. The backoff represents a difference between transmission power and maximum output power of the amplifier. When the backoff of the amplifier is relieved, transmission power of the UE increases, leading to an increase in a UL beam transmission range, but there is a tradeoff in that linearity is damaged.

The BS may use an AI model to learn transmission amplifier characteristics of the UE, and improve UL spectral efficiency by compensating for the damaged linearity while increasing transmission power by relieving the backoff of the UE amplifier. In other words, to relieve the backoff of the amplifier, the UE needs to increase the intensity of emission beams, which may increase power consumption of the UE.

The execution mode of the AI model enabled function related to the operation of relieving the backoff of the amplifier of the UE may be determined in phases according to the degree of backoff reduction, for example as summarized in Table 3.

TABLE 3

| Mode | Description |
| --- | --- |
| Mode 1 | Backoff reduction 100% |
| Mode 2 | Backoff reduction 50% |
| Mode 3 | Backoff reduction 0% |

Referring to Table 3, the execution mode of the AI model enabled function related to the operation of relieving the backoff of the amplifier of the UE may be determined in three types according to the degree of backoff reduction. The smaller the degree of backoff reduction, the lower the power mode. Accordingly, in the embodiment of Table 3, mode 2 is the low power mode as compared to mode 1, and mode 3 is the low power mode as compared to the mode 2. The mode 3 corresponding to 0% of the degree of backoff reduction may also correspond to an off state of the AI model enabled function.

Although an embodiment of three-step execution modes of the AI model enabled function is illustrated in Table 3, the execution mode of the AI model enabled function may have a greater or lesser number of execution modes.

When determining whether to change the execution mode of the AI model enabled function, the UE may transmit corresponding information to the BS. Alternatively, the UE may transmit, to the BS, information indicating that support for the AI model enabled function is not available according to the status information of the UE.

The AI model enabled function may be related to another technology that uses an AI model for operations of the UE or the BS.

For example, the AI model enabled function may be related to a technology that uses an AI model for operations of the UE inferring CSI in real time. With the increase in the number of channels as various functions are executed, the amount of CSI to be measured by the UE increases, and consumption of resources of the UE increases in the process of reporting the huge amount of CSI feedback to the BS. Hence, to reduce the resource consumption in the process of the CSI feedback, a CSI compression technology, a method by which to compress CSI and transmit the compressed CSI, may be used. In an embodiment, an autoencoder for CSI compression may include an encoder on the UE side and a decoder on the BS side, the encoder and the decoder each including an AI model.

The execution modes of an AI model enabled function for various AI related operations of the UE may be determined as a mode corresponding to an on state of the function or as a mode corresponding to an off state of the function, for example as summarized in Table 4.

TABLE 4

| Mode | Description |
| --- | --- |
| Mode 1 | feature ON state |
| Mode 2 | feature OFF state |

Referring to Table 4, the execution mode of the AI model enabled function may be determined to have two types of execution modes according to the ON or OFF state. Non-execution of a certain function corresponds to a relatively lower power mode than when the certain function is executed. Accordingly, in the embodiment of Table 4, the mode 2 is a lower power mode than the mode 1.

Although an embodiment of two-step execution modes of the AI model enabled function is illustrated in Table 4, the execution mode of the AI model enabled function may have a greater or lesser number of execution modes.

In an embodiment, when determining whether to change the execution mode of the AI model enabled function, a UE modem may transmit corresponding information to an external device such as the BS or to an internal processor such as a graphic processing unit (GPU) or a CPU (AI orchestrator) by the UE. Alternatively, the UE may transmit, to the BS or a processor in the UE, information indicating that support for the AI model enabled function is not available according to the status information of the UE and associated data will not be provided.

Referring to FIG. 1, the UE 10 may control or change the execution mode of each of communication platform functions 101 to 104 being executed by the UE 10 based on the status information obtained. For example, the status information obtained may include at least one of a remaining battery capacity, an amount of power consumption per unit of time, data throughput per unit of time, data transfer rate, or an amount of heat generation. The status information may be obtained by a sensor included in the UE 10.

For example, the UE 10 may change execution modes of the functions being executed (the first to fourth functions 101 to 104) to a low power mode based on the battery capacity of the UE 10. On the other hand, when obtaining the status information indicating that the battery capacity is sufficient, the UE 10 may change the functions being executed from the low power mode to a normal mode. Specifically, the UE 10 may determine to enter the low power mode or release the low power mode based on the status information, e.g., battery capacity.

For example, the UE 10 may change execution modes of the functions being executed to a heat generation control mode based on the amount of heat generation. On the other hand, when obtaining the status information indicating that the amount of heat generation is small, the UE 10 may change the functions being executed from the heat generation control mode to the normal mode. Specifically, the UE 10 may determine to enter the heat generation control mode or release the heat generation control mode based on the status information (e.g., the amount of heat generation).

For example, the UE 10 may change execution modes of the functions being executed to a fast mode based on the data throughput per unit of time of the UE 10. On the other hand, when obtaining the status information indicating that the data throughput per unit of time is sufficient, the UE 10 may change the functions being executed from the fast mode to a slow mode. Specifically, the UE 10 may determine to enter the fast mode or release the fast mode based on the status information (e.g., data throughput per unit of time).

The UE 10 may determine respective priorities of the functions being executed by the UE 10 based on the status information or function features obtained. Subsequently, at least one function whose execution mode is to be changed among the functions being executed may be identified based on the determined priorities.

For example, when execution modes of functions must be changed to the low power mode or the heat generation control mode, i.e., when functions being currently executed need to be limited, the UE 10 may change the execution mode from a function with the lowest priority. On the other hand, when execution modes of functions need to release the low power mode or release the heat generation control mode, i.e., when functions being currently executed need to be intensified, the UE 10 may change the execution mode from a function with the highest priority.

In FIG. 1, the UE 10 may change execution modes of three (the first to third functions 101 to 103) of the four functions being executed (the first to fourth functions 101 to 104), and a UE 15 corresponds to the UE 10 after the change of the modes.

The execution mode of the first function 101 may be changed into an off state. For example, when the first function 101 has the lowest priority and may safely be deactivated according to the priorities of the functions being executed by the UE 10, the UE 10 may change the first function 101 into an off mode 151 based on the UE status information. The first function 151 changed into the off mode may be considered as being deactivated or as being changed to a communication technology of a lower version. For example, when the first function 101 is an XDD function, the first function 151 performed by the UE 15 after the mode change may be implemented by deactivation of the XDD function and activation of a function of a lower version, i.e., a time division duplex (TDD) function.

The execution mode of the second function 102 may be changed to mode 2-3. For example, the execution mode of the second function 102 may include at least three modes, mode 2-1, mode 2-2 and mode 2-3 where the mode 2-2 is a lower power mode than the mode 2-1 and the mode 2-3 is a lower power mode than the mode 2-2. Specifically, referring to FIG. 1, the second function 102 may be changed by two steps from mode 2-1 to mode 2-3 152 according to the status information and needs of the UE 10.

The execution mode of the third function 103 may be changed to mode 3-2. For example, the execution mode of the third function 103 may include at least two modes, mode 3-1 and mode 3-2. In an embodiment, the mode 3-1 may be a lower power mode than the mode 3-2, or the mode 3-2 may be a lower power mode than the mode 3-1. Specifically, referring to FIG. 1, the third function 103 may be changed from mode 3-1 to mode 3-2 153 according to the status information and needs of the UE 10.

The fourth function 104 whose execution mode remains the same may be performed in the same mode 154 after the change.

Figure 2:
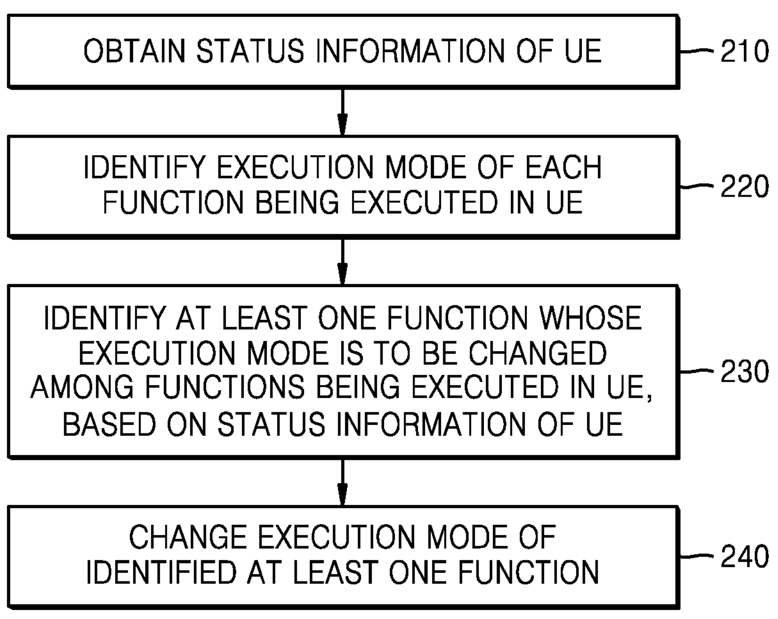
FIG. 2 is a flowchart of a method of controlling an execution mode of a function being executed by a UE in a wireless communication system, according to an embodiment.

FIG. 2 is a flowchart of a method of controlling an execution mode of a function being executed by a UE in a wireless communication system, according to an embodiment.

In an embodiment, the UE may change the execution mode of at least one of functions being executed, based on the status information.

In step 210, the UE obtains status information of the UE. For example, the UE may obtain at least one piece of information about a remaining battery capacity, an amount of power consumption per unit of time, data throughput per unit of time, data transfer rate, or an amount of heat generation.

The status information of the UE may be obtained through a sensor included in the UE.

The status information of the UE may be obtained in preset cycles. For example, the UE may measure or obtain the status information at intervals of 10 seconds.

In step 220, the UE identifies an execution mode of each of the functions being executed by the UE. In an embodiment of the UE, step 220 may be performed before step 210 or at the same time with step 210.

The UE may obtain at least one piece of information about a list of functions being currently executed, a list of functions not executed currently but available to be executed by the UE, or execution modes of the respective functions. For example, the functions may include an X-MIMO function, a high frequency enabled function, an XDD function, a multi-TRP function, an AI model enabled function, or other various functions. Execution modes of a certain function may be classified into two or more execution modes, and when the function is performed in the different execution modes, the status information of the UE may differ accordingly.

In step 230, the UE identifies at least one function whose execution mode is to be changed among the functions being executed by the UE based on the status information obtained.

The at least one function whose execution mode is to be changed may differ by the status information that is a basis for identification of the function.

The operation of identifying at least one function whose execution mode is to be changed among the functions being executed by the UE may include determining a priority of each of the functions being executed by the UE based on the status information of the UE and identifying the at least one function whose execution mode is to be changed among the functions being executed by the UE based on the determined priorities.

For example, when execution modes of functions need to be changed to the low power mode or the heat generation control mode, i.e., when functions being currently executed need to be limited, the UE may change the execution mode from a function with the lowest priority. On the other hand, when execution modes of functions need to release the low power mode or release the heat generation control mode, i.e., when functions being currently executed need to be intensified, the UE may change the execution mode from a function with the highest priority.

At least one function whose execution mode is to be changed may include a first function and a second function. In this case, the operation of changing the execution mode of the identified at least one function includes changing an execution mode of the first function, obtaining status information of the UE updated based on the change of the execution mode of the first function, and determining whether to change the execution mode of the second function based on the updated status information of the UE. The changing of the execution mode of one function and the determining of whether to further change the execution mode of the function or other function based on the updated status information is further described in FIG. 3.

The execution mode may include a deactivated mode, and the changing of the execution mode of the identified at least one function may include deactivating at least one function being executed by the UE. The operation in which the execution mode of the function is changed to the deactivated mode may correspond to an operation in which the first function 101 is changed into the off mode as shown in FIG. 1.

After obtaining the status information of the UE, a UE application processor (AP) may indicate a change of the execution mode of at least one function to a UE communication processor (CP) through an inter-process command (IPC). For example, the IPC may have a value of TRUE indicating that the execution mode of at least one function is to be changed or a value of FALSE indicating that execution modes of functions being executed are to remain the same without change. For example, the IPC may have a value of negative one (−1) indicating that the execution mode of at least one function is to be downgraded, zero (0) indicating that the execution modes of functions being executed are to remain the same without change, or one (1) indicating that the execution mode of at least one function is to be upgraded. In the meantime, the value of the IPC transmitted from the UE AP to the UE CP is not limited to the aforementioned examples, but may be implemented in various forms.

When the UE CP is unable to perform an operation corresponding to the IPC received from the UE AP, the UE CP may ignore the IPC. For example, when a current execution mode of a certain function is the lowest power mode and the received IPC value indicates that the execution mode is to be changed to a low power mode, the received IPC may be ignored. When a current execution mode of a certain function is a normal mode and the received IPC value indicates that the low power mode of the execution mode is to be released, the received IPC may be ignored.

In step 240, the UE changes the execution mode of the identified at least one function. The UE may change at least one function whose execution mode is determined to be changed from the current execution mode to a different mode, or stop performing the function. In an embodiment, when the UE is unable to change the execution mode of the function by itself, the UE may transmit, to the BS, an execution mode change request message including information having determination to change the execution mode of the function, and the execution mode of the function may also be controlled by the BS.

As such, an efficient communication service is provided by controlling respective modes of functions being executed based on a condition of the UE in the wireless communication system that employ various technologies.

Modem functions may be limited in detail by controlling the respective modes of the functions in phases, and characteristics of the UE such as power consumption per unit of time, data throughput per unit of time, data transfer rate or an amount of heat generation may be flexibly controlled as required.

Figure 3:
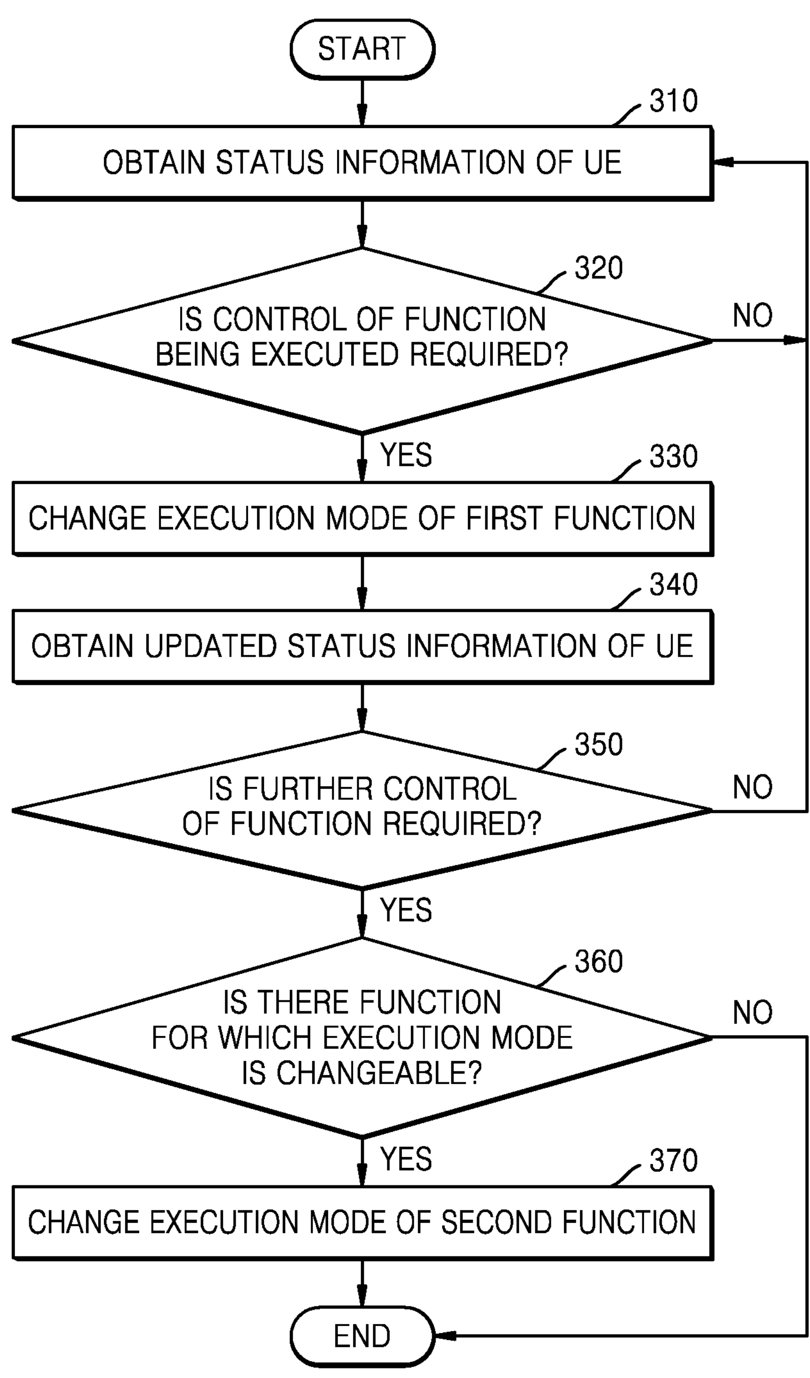
FIG. 3 is a flowchart of a method of controlling an execution mode of at least one function being executed by a UE in a wireless communication system, according to an embodiment.

FIG. 3 is a flowchart of a method of controlling an execution mode of at least one function being executed by a UE in a wireless communication system, according to an embodiment.

The UE may change the execution mode of at least one of functions being executed, based on status information.

In step 310, the UE obtains status information of the UE. For example, the UE may obtain at least one piece of information about a remaining battery capacity, an amount of power consumption per unit of time, data throughput per unit of time, data transfer rate, or an amount of heat generation, and the status information of the UE may be obtained through a sensor included in the UE. The status information of the UE may also be obtained in preset cycles. Step 310 of FIG. 3 may correspond to step 210, as described above, of FIG. 2.

In step 320, the UE may determine whether at least some of the functions being currently executed by the UE need to be controlled based on the status information obtained. When it is determined that control of the execution mode of a function is not required, the method returns to step 310 to obtain status information. Step 320 of FIG. 3 may correspond to steps 220 and 230 of FIG. 2.

When it is determined that the control of the execution mode of the function is required, the method proceeds to step 330. In step 330, the UE changes the execution mode of the first function determined to require control of the execution mode.

The first function may be selected from among the functions currently being executed by the UE is based on the status information of the UE and priorities between the functions. For example, when execution modes of functions need to be changed to the low power mode or the heat generation control mode, i.e., when functions being currently executed need to be limited, the UE may select a function with the lowest priority as the first function. On the other hand, when execution modes of functions need to release the low power mode or release the heat generation control mode, i.e., when functions being currently executed need to be intensified, the UE may select a function with the highest priority as the first function.

The execution mode may include a deactivated mode, and the changing of the execution mode of the first function may include deactivating the first function. The operation in which the execution mode of the first function is changed to the deactivated mode may correspond to the operation in which the first function 101 is changed into the OFF mode as shown in FIG. 1.

Step 330 of FIG. 3 may correspond to step 240 as described above in FIG. 2.

In step 340, the UE may obtain status information of the UE updated based on the change of the execution mode of the first function. The updated status information of the UE may be obtained a preset time after the status information of the UE is obtained in step 310.

In step 350, the UE may determine whether at least some of the functions being currently executed by the UE need to be further controlled based on the updated status information obtained. When it is determined that further control of the execution mode of the function is not required, the method returns to step 310 to obtain status information.

When it is determined that further control of the execution mode of the function is required, the method proceeds to step 360. In step 360, the UE may determine whether there is a function being executed for which the execution mode is changeable. When no function is being executed for which the execution mode is changeable, the method may be terminated.

When there is a function being executed for which the execution mode is changeable, the method may proceed to step 370. In step 370, the UE may change the execution mode of a second function determined to require control.

The second function may be selected from among the functions being currently executed by the UE based on the status information of the UE and priorities between the functions. For example, when execution modes of functions need to be changed to the low power mode or the heat generation control mode, i.e., when functions being currently executed need to be limited, the UE may select a function with the lowest priority as the second function. On the other hand, when execution modes of functions need to release the low power mode or the heat generation control mode, i.e., when functions being currently executed need to be intensified, the UE may select a function with the highest priority as the second function.

The second function whose execution mode is to be further changed may be the same as or different from the first function with the execution mode changed in step 330. When the second function is the same as the first function, it may correspond to controlling the execution mode in phases for one function.

The execution mode may include a deactivated mode, and changing of the execution mode of the second function may include deactivating the second function. The operation in which the execution mode of the first function is changed to the deactivated mode may correspond to the operation in which the first function 101 is changed into the off mode as shown in FIG. 2.

Figure 4:
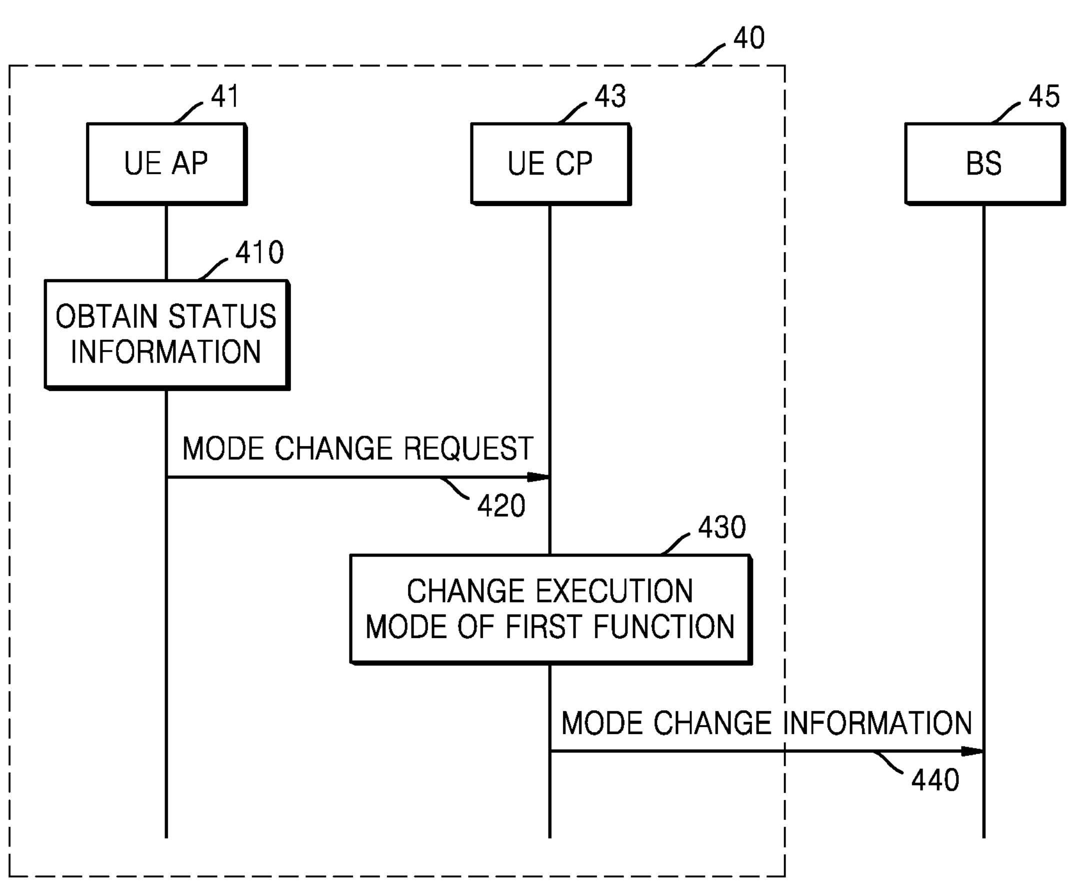
FIG. 4 illustrates operations of a UE changing an execution mode of at least one function and transmitting execution mode change information to a base station (BS), according to an embodiment.

FIG. 4 illustrates a flow diagram describing operations of a UE changing an execution mode of at least one function and transmitting execution mode change information to a BS, according to an embodiment.

Referring to FIG. 4, a UE 40 may include a UE AP 41 operating as a CPU of the UE 40 and a UE CP 43 operating as a communication modem of the UE 40.

In operation 410, the UE 40 may obtain status information of the UE through the UE AP 41. Operation 410 of FIG. 4 may correspond to step 210 of FIG. 2 and step 310 or 340 of FIG. 3.

In operation 420, the UE AP 41 may transmit, to the UE CP 43, a mode change request message for at least one function. After obtaining the status information of the UE 40, the UE AP 41 may indicate a change of execution mode of at least one function to the UE CP 43 through an IPC. For example, the IPC may have a value of TRUE indicating that the execution mode of at least one function is to be changed or a value of FALSE indicating that the execution modes of functions being executed are to remain the same without change. For example, the IPC may have a value of negative one (−1) indicating that the execution mode of at least one function is to be downgraded, zero (0) indicating that the execution modes of functions being executed are to remain the same without change, or one (1) indicating that the execution mode of at least one function is to be upgraded. In the meantime, the value of the IPC transmitted from the UE AP 41 to the UE CP 43 is not limited to the aforementioned examples, but may be implemented in various forms.

When the UE CP 43 is unable to perform an operation corresponding to the IPC received from the UE AP 41, the UE CP 43 may ignore the IPC. For example, when a current execution mode of a certain function is the lowest power mode and the received IPC value indicates that the execution mode is to be changed to a low power mode, the received IPC may be ignored. When a current execution mode of a certain function is a normal mode and the received IPC value indicates that the low power mode of the execution mode is to be released, the received IPC may be ignored.

In operation 430, the UE 40 may change the execution mode of the first function identified through the UE CP 43. Operation 430 of FIG. 4 may correspond to steps 230 and 240 of FIG. 2 and step 330 or 370 of FIG. 3.

In operation 440, the UE 40 may transmit, to the BS 45, execution mode change information for the first function. For example, the message transmitted by the UE 40 to the BS 45 may include an identity of a target function whose execution mode is changed and information about an execution mode after the change. The message transmitted by the UE 40 to the BS 45 may be configured as a separate message for each target function whose execution mode is changed.

When the UE 40 is unable to change the execution mode of the function by itself, the UE 40 may transmit, to the BS 45, an execution mode change request message including information having determination to change the execution mode of the function, and the execution mode of the function may also be controlled by the BS 45.

For example, when determining whether to change the execution mode of the XDD function, the UE 40 may transmit corresponding information to the BS 45 and request a resource allocation change. On receiving the resource allocation change request message from the UE 40 with the change of execution mode of the XDD function, the BS 45 may transmit a resource allocation change response message to the UE 40. Alternatively, the UE 40 may transmit, to the BS 45, information indicating that support for the XDD function is not available according to the status information of the UE 40.

For example, when determining whether to change the execution mode of the multi-TRP function, the UE 40 may transmit corresponding information to the BS 45. Alternatively, the UE 40 may provide feedback to the BS 45 by measuring channel state information for only N channels smaller than the total number of channels instead of explicitly notifying the BS 45 of a change of execution mode of the multi-TRP function. In this case, the UE 40 may limit a PMI of the CSI feedback to codebook layer N, and may also report an RI as N to the BS 45. Alternatively, the UE 40 may transmit, to the BS 45, information indicating that support for the multi-TRP function is not available according to status information of the UE 40.

When the information needs to be provided to the BS 45 to change the execution mode of the function, the execution mode change information of the function may be transmitted to the BS 45 in a UE assistance information (UAI) message, for example as summarized in Table 5.

TABLE 5

```
OverheatingAssistance ::=              SEQUENCE {
  reducedMaxCCs                          SEQUENCE {
    reducedCCsDL                           INTEGER (0..31),
    reducedCCsUL                           INETGER (0..31)
  } OPTIONAL,
  reducedMaxBW-FR1                       SEQUENCE {
    reducedBW-FR1-DL                       ReducedAggregatedBandwidth,
    reducedBW-FR1-UL                       ReducedAggregatedBandwidth
  } OPTIONAL,
  reducedMaxBW-FR2                       SEQUENCE {
    reducedBW-FR2-DL                       ReducedAggregatedBandwidth,
    reducedBW-FR2-UL                       ReducedAggregatedBandwidth
  } OPTIONAL,
  reducedMaxMIMO-LayersFR1               SEQUENCE {
    reducedMIMO-LayersFR1-DL               MIMO-LayersDL,
    reducedMIMO-LayersFR1-UL               MIMO-LayersUL
  } OPTIONAL,
  reducedMaxMIMO-LayersFR2               SEQUENCE {
    reducedMIMO-LayersFR2-DL               MIMO-LayersDL,
    reducedMIMO-LayersFR2-UL               MIMO-LayersUL
  } OPTIONAL
}
ReducedAggregatedBandwidth ::= ENUMERATED {mhz0, mhz10, mhz20, mhz30,
mhz40, mhz50, mhz60, mhz80, mhz100, mhz200, mhz300, mhz400}
```

Table 5 represents syntax of the UAI message. In an embodiment, the execution mode change information for the function may be included in the UAI message. For example, the UAI message may have features included in Table 6, below.

TABLE 6

| | |
|---|---|
| Signaling radio bearer | SRB1 |
| RLC (radio link control)-SAP (service access point) | AM (acknowledge mode) |
| Logical Channel | DCCH (dedicated control channel) |
| Direction | UE to BS/network |

Subsequently, on receiving a release request of a radio resource control (RRC) connection from the UE 40 or a network, the BS 45 may release the RRC connection and prevent RRC reconnection unless there is no additional request. The release request from the UE 40 may be received in a LOWPWRCTRL_ACTION message.

Figure 5:
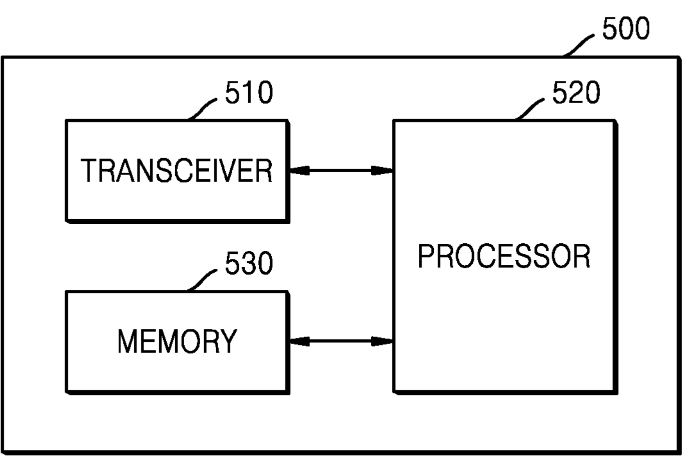
FIG. 5 is a block diagram of a UE, according to an embodiment.

FIG. 5 is a block diagram of a UE 500, according to an embodiment.

Referring to FIG. 5, the UE 500 may include a transceiver 510, a processor 520, and a memory 530. Elements of the UE 500 are not, however, limited thereto. For example, the UE 500 may include a greater or lesser number of elements than described above. The transceiver 510, the processor 520, and the memory 530 may be implemented in a single chip.

The processor 520 may include one or more processors. The one or more processors may include a universal processor such as a CPU, an AP, a digital signal processor (DSP), etc., a GPU, a vision processing unit (VPU), etc., or a dedicated AI processor such as a neural processing unit (NPU). For example, when the one or more processors are the dedicated AI processors, the dedicated AI processors may be designed in a hardware structure that is specific to dealing with a particular AI model.

The processor 520 may control a series of processes for the UE 500 to be operated according to the embodiments of the disclosure. For example, the processor 520 may receive control signals and data signals through the transceiver 510 and process the received control signals and data signals. The processor 520 may transmit the processed control signal and data signal through the transceiver 510. The processor 520 may control input data derived from the received control signal and data signal to be processed according to a predefined operation rule or AI model stored in the memory 530. The processor 520 may record data to the memory 530 or read out data from the memory 1430. The processor 520 may further perform functions of a protocol stack requested by a communication standard. The processor 520 may include at least one processor, and part of the transceiver 510 or the processor 520 may be referred to as a CP.

The memory 530 may store a program and data required for operation of the UE 500. The memory 530 may store control information or data included in a signal obtained by the UE 500. The memory 530 may store predefined operation rules or an AI model used by the UE 500. The memory 530 may include a storage medium such as a read only memory (ROM), a random access memory (RAM), a hard disk, a compact disc ROM (CD-ROM), and a digital versatile disk (DVD), or a combination of storage mediums. Alternatively, the memory 530 may not be separately present but integrated into the processor 520. The memory 530 may include a volatile memory, a non-volatile memory, or a combination of the volatile memory and the non-volatile memory. The memory 530 may also provide the stored data at the request of the processor 520.

The transceiver 510 may refer to a transmitter and a receiver, and the transceiver 510 of the UE 500 may transmit or receive signals to or from a BS or a network entity. The signals may include control information and data. For this, the transceiver 510 may include an RF transmitter for up-converting the frequency of a signal to be transmitted and amplifying the signal and an RF receiver for low-noise amplifying a received signal and down-converting the frequency of the received signal. It is merely an example of the transceiver 510, and the elements of the transceiver 510 are not limited to the RF transmitter and RF receiver. In addition, the transceiver 510 may receive a signal on a wireless channel and output the signal to the processor 520, and transmit a signal output from the processor 520 on a wireless channel.

The processor 520 may obtain status information of the UE 500, identify an execution mode of each function being executed by the UE 500, identify at least one function whose execution mode is to be changed among the functions being executed by the UE 500 based on the status information of the UE 500, and change the execution mode of the identified at least one function.

The processor 520 may determine a priority of each of the functions being executed by the UE 500 based on the status information of the UE 500, and identify at least one function whose execution mode is to be changed among the functions being executed by the UE 500 based on the determined priorities.

The processor 520 may change the execution mode of the first function, obtain status information of the UE 500 updated with the change of the execution mode of the first function, and determine whether to change the execution mode of the second function based on the updated status information of the UE 500.

The processor 520 may deactivate at least one function being executed by the UE 500.

The processor 520 may transmit execution mode change information of the at least one function to the BS through the transceiver 510.

Figure 6:
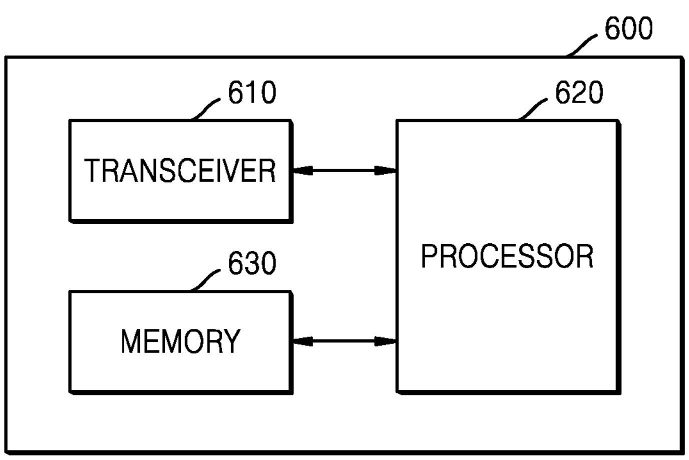
FIG. 6 is a block diagram of a BS, according to an embodiment.

FIG. 6 is a block diagram of a BS 600 according to an embodiment.

Referring to FIG. 6, the BS 600 may include a transceiver 610, a processor 620, and a memory 630. The transceiver 610, the processor 620 and the memory 630 of the BS 600 may operate according to the aforementioned communication method of the BS 600. Elements of the BS 600 are not, however, limited thereto. For example, the base station 600 may include a greater or lesser number of elements than described above. The transceiver 610, the processor 620, and the memory 630 may be implemented in a single chip. The processor 620 may include one or more processors.

A receiver and a transmitter of the BS 600 are collectively called the transceiver 610, which may transmit or receive signals to or from a UE or a network entity. The signals to be transmitted to or received from the UE or the network entity may include control information and data. For this, the transceiver 610 may include an RF transmitter for up-converting the frequency of a signal to be transmitted and amplifying the signal and an RF receiver for low-noise amplifying a received signal and down-converting the frequency of the received signal. It is merely an example of the transceiver 610, and the elements of the transceiver 610 are not limited to the RF transmitter and RF receiver.

The transceiver 610 may perform functions for transmitting and receiving signals on a wireless channel. For example, the transceiver 610 may receive a signal on a wireless channel and output the signal to the processor 620, and transmit a signal output from the processor 620 on a wireless channel.

The memory 630 may store a program and data required for operation of the base station 600. The memory 630 may store control information or data included in a signal obtained by the BS. The memory 630 may include a storage medium such as a ROM, a RAM, a hard disk, a CD-ROM, and a DVD, or a combination of storage mediums. Alternatively, the memory 630 may not be separately present but integrated into the processor 620. The memory 630 may include a volatile memory, a non-volatile memory, or a combination of the volatile memory and the non-volatile memory. The memory 630 may also provide the stored data at the request of the processor 620.

The processor 620 may control a series of processes for the BS 600 to be operated according to the embodiments of the disclosure. For example, the processor 620 may receive control signals and data signals through the transceiver 610 and process the received control signals and data signals. The processor 620 may transmit the processed control signal and data signal through the transceiver 610. The processor 620 may record data to the memory 630 or read out data from the memory 1330. The processor 620 may perform functions of a protocol stack requested by a communication standard. For this, the processor 620 may include at least one processor or microprocessor, and part of the transceiver 610 and the processor 620 may be referred to as a CP.

The processor 620 may include one or more processors. The one or more processors may include a universal processor such as a CPU, an AP, a DSP, etc., a GPU, a VPU, etc., or a dedicated AI processor such as an NPU. For example, when the one or more processors are the dedicated AI processors, they may be designed in a hardware structure that is specific to dealing with a particular AI model.

The processor 620 may receive execution mode change information of the at least one function from the UE through the transceiver 610. The execution mode change information of the function may include information relating to the at least one function for which the UE changes the execution mode. For example, the execution mode change information may include at least one of an identity of a function to be changed or information about an execution mode after the change.

Functions related to AI according to embodiments of the disclosure are operated through a processor and a memory. There may be one or more processors. The one or more processors may include a universal processor such as a CPU, an AP, a DSP, etc., a GPU, a VPU, etc., or a dedicated AI processor such as an NPU. The one or more processors may control processing of input data according to a predefined operation rule or an AI model stored in the memory. When the one or more processors are the dedicated AI processors, they may be designed in a hardware structure that is specific to dealing with a particular AI model.

The predefined operation rule or the AI model may be made by learning. Specifically, the predefined operation rule or the AI model being made by learning refers to the predefined operation rule or the AI model established to perform a desired feature (or an object) being made when a basic AI model (or a deep learning model) is trained by a learning algorithm with a lot of training data. Such learning may be performed by a device itself in which AI is performed according to the disclosure, or by a separate server and/or system. Examples of the learning algorithm may include supervised learning, unsupervised learning, semi-supervised learning, or reinforcement learning, without being limited thereto.

The AI model (or deep learning model) may be made up of a plurality of neural network layers. Each of the plurality of neural network layers may have a plurality of weight values, and perform neural network operation through operation between an operation result of the previous layer and the plurality of weight values. The plurality of weight values owned by the plurality of neural network layers may be optimized by learning results of the AI model. For example, the plurality of weight values may be updated to reduce or minimize a loss value or a cost value obtained by the AI model during a training procedure. An artificial neural network may include a deep neural network (DNN), for example, a convolutional neural network (CNN), a recurrent neural network (RNN), a restricted Boltzmann machine (RBM), a deep belief network (DBN), a bidirectional recurrent deep neural network (BRDNN), or a deep Q-network, without being limited thereto.

Various embodiments of the disclosure may be implemented or supported by one or more computer programs, which are formed of computer-readable program codes and may be embodied on a computer-readable medium. The terms application and program may refer to one or more computer programs, software components, instruction sets, procedures, functions, objects, classes, instances, associated data, or part thereof, suitably implemented in computer-readable program codes. The computer-readable program codes may include various types of computer codes including source codes, target codes and executable codes. The computer-readable medium may include various types of medium accessible by a computer, such as a ROM, RAM, a hard disk drive (HDD), a compact disc (CD), a DVD or other various types of memory.

The computer-readable storage medium may be provided in the form of a non-transitory storage medium. The non-transitory storage medium is a tangible device, which may exclude wired, wireless, optical, or other communication links to transmit the transitory electric or other signals. The non-transitory storage medium does not discriminate between an occasion when data is semi-permanently stored and an occasion when data is temporarily stored in the storage medium. For example, the non-transitory storage medium may include a buffer that temporarily stores data. The computer-readable medium may be an arbitrary available medium that may be accessed by the computer, including volatile, non-volatile, removable, and non-removable mediums. The computer-readable medium includes a medium for storing data permanently, and a medium for storing data which can be overwritten afterward, i.e., a rewritable optical disk or an erasable memory device.

The aforementioned method according to the various embodiments may be provided in a computer program product. The computer program product may be a commercial product that may be traded between a seller and a buyer. The computer program product may be distributed in the form of a storage medium (e.g., a CD-ROM), through an application store, directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

Several embodiments have been described, but a person of ordinary skill in the art will understand and appreciate that various modifications can be made without departing the scope of the disclosure. For example, the aforementioned method may be performed in a different order, and/or the aforementioned systems, structures, devices, circuits, etc., may be combined in different combinations from what is described above, or replaced or substituted by other components or equivalents thereof, to obtain appropriate results. Thus, it will be apparent that the disclosure is not limited to the embodiments described from every aspect. For example, an element described in the singular form may be implemented as being distributed, and elements described in a distributed form may be implemented as being combined.

According to the method and apparatus for controlling execution modes of functions being executed in a UE in a wireless communication system, efficient communication services may be provided by controlling the respective modes of the functions being executed based on a condition of the UE in the wireless communication system that employs various technologies.

Modem functions may be limited in detail by controlling the respective modes of the functions in phases, and the UE's power consumption per unit of time, data throughput per unit of time, data transfer rate or an amount of heat generation may be flexibly controlled as required.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method by which a user equipment (UE) operates in a wireless communication system, the method comprising:

obtaining status information of the UE;

identifying an execution mode of each function of a plurality of functions being executed by the UE;

identifying at least one function whose execution mode is to be changed among the functions being executed by the UE, based on the obtained status information of the UE; and changing the execution mode of the identified at least one function, wherein the status information of the UE comprises at least one of a remaining battery capacity, an amount of power consumption per unit of time, data throughput per unit of time, data transfer rate, or an amount of heat generation, and wherein the execution mode of each function includes three or more modes in phases of at least one of power consumption, heat generation control, or execution speed, wherein the execution mode comprises a deactivated mode, and wherein changing the execution mode of the identified at least one function comprises deactivating the identified at least one function being executed by the UE.

2. The method of claim 1, wherein the status information of the UE is obtained through a sensor included in the UE.

3. The method of claim 1, wherein identifying the at least one function whose execution mode is to be changed among the functions being executed by the UE comprises:

determining a priority of each function being executed by the UE, based on the status information of the UE; and identifying at least one function whose execution mode is to be changed among the functions being executed by the UE, based on the determined priority of each function being executed by the UE.

4. The method of claim 1, wherein the at least one function whose execution mode is to be changed comprises a first function and a second function, and wherein changing the execution mode of the identified at least one function comprises:

changing an execution mode of the first function;

obtaining status information of the UE updated based on the changing of the execution mode of the first function; and determining whether to change an execution mode of the second function, based on the updated status information of the UE.

5. The method of claim 1, further comprising transmitting, to a base station, execution mode change information of the at least one function.

6. A user equipment (UE) for controlling an execution mode of a function in a wireless communication system, the UE comprising:

a transceiver; and at least one processor, wherein the at least one processor is configured to:

obtain status information of the UE, identify an execution mode of each function of a plurality of functions being executed by the UE, identify at least one function whose execution mode is to be changed among the functions being executed by the UE, based on the obtained status information of the UE, and change an execution mode of the identified at least one function, wherein the status information of the UE comprises at least one of a remaining battery capacity, an amount of power consumption per unit of time, data throughput per unit of time, data transfer rate, or an amount of heat generation, and wherein the execution mode of each function includes three or more modes in phases of at least one of power consumption, heat generation control, or execution speed, wherein the execution mode comprises a deactivated mode, and wherein the at least one processor is further configured to change the execution mode of the identified at least one function by deactivating the identified at least one function being executed by the UE.

7. The UE of claim 6, further comprising a sensor configured to obtain the status information.

8. The UE of claim 6, wherein the at least one processor is further configured to:

determine a priority of each function being executed by the UE, based on the status information of the UE, and identify at least one function whose execution mode is to be changed among the functions being executed by the UE, based on the determined priority of each function being executed by the UE.

9. The UE of claim 6, wherein the at least one function whose execution mode is to be changed comprises a first function and a second function, and wherein the at least one processor is further configured to:

change an execution mode of the first function, obtain status information of the UE updated based on the changing of the execution mode of the first function, and determine whether to change an execution mode of the second function, based on the updated status information of the UE.

10. The UE of claim 6, wherein the at least one processor is further configured to transmit, to a base station through the transceiver, execution mode change information of the at least one function.

11. A non-transitory computer-readable recording medium having recorded thereon a program for causing a computer to perform a method comprising:

obtaining status information of a user equipment (UE);

identifying an execution mode of each function of a plurality of functions being executed by the UE;

identifying at least one function whose execution mode is to be changed among the functions being executed by the UE, based on the obtained status information of the UE; and changing the execution mode of the identified at least one function, wherein the status information of the UE comprises at least one of a remaining battery capacity, an amount of power consumption per unit of time, data throughput per unit of time, data transfer rate, or an amount of heat generation, and wherein the execution mode of each function includes three or more modes in phases of at least one of power consumption, heat generation control, or execution speed, wherein the execution mode comprises a deactivated mode, and wherein changing the execution mode of the identified at least one function comprises deactivating the identified at least one function being executed by the UE.

12. The non-transitory computer-readable recording medium of claim 11, wherein the status information of the UE is obtained through a sensor included in the UE.

13. The non-transitory computer-readable recording medium of claim 11, wherein identifying the at least one function whose execution mode is to be changed among the functions being executed by the UE comprises:

determining a priority of each function being executed by the UE, based on the status information of the UE; and identifying at least one function whose execution mode is to be changed among the functions being executed by the UE, based on the determined priority of each function being executed by the UE.

14. The non-transitory computer-readable recording medium of claim 11, wherein the at least one function whose execution mode is to be changed comprises a first function and a second function, and wherein changing the execution mode of the identified at least one function comprises:

changing an execution mode of the first function;

obtaining status information of the UE updated based on the changing of the execution mode of the first function; and determining whether to change an execution mode of the second function, based on the updated status information of the UE.

15. The non-transitory computer-readable recording medium of claim 11, wherein the method performed by the computer through the recorded program further comprises transmitting, to a base station, execution mode change information of the at least one function.

* * * * *